United States Patent Office 3,132,505
Patented May 12, 1964

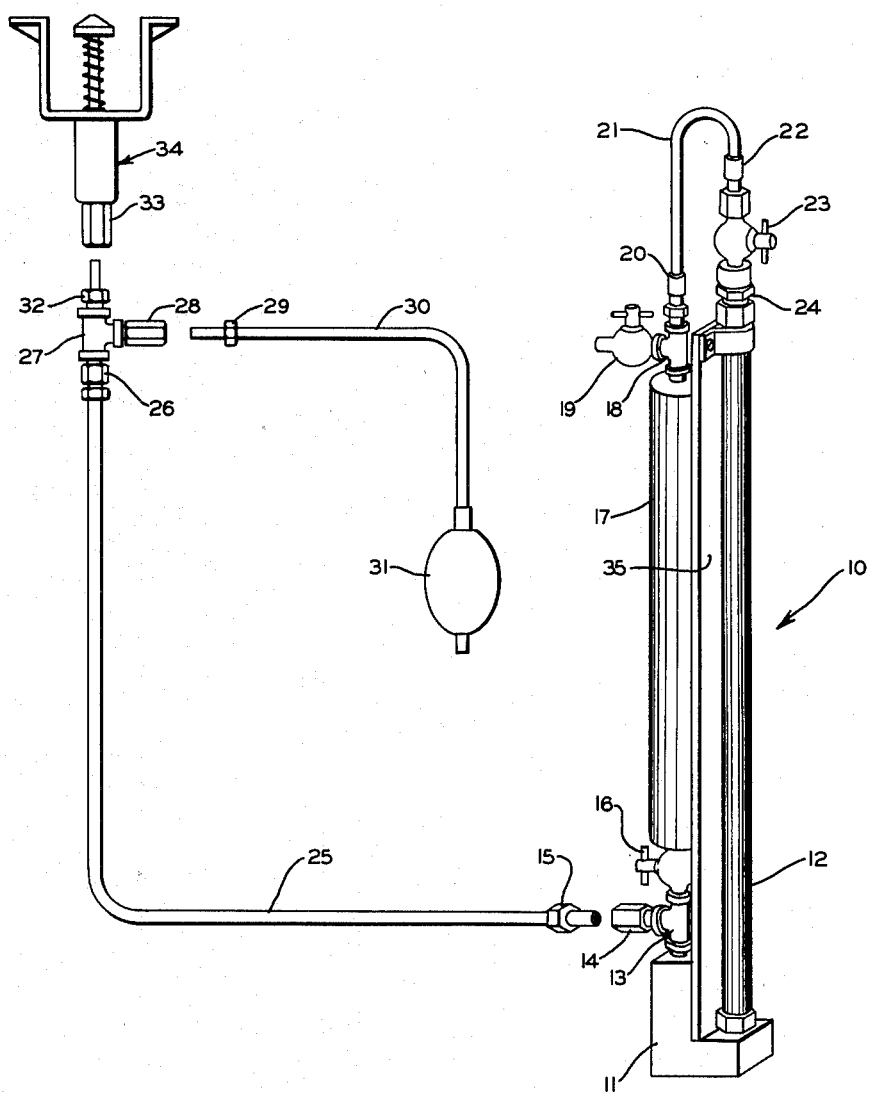

3,132,505
TESTING DEVICE
Walter F. Kuhlman, Norwalk, Ohio, assignor to Kuhlman Instrument Company, Norwalk, Ohio, a corporation of Ohio
Filed June 22, 1961, Ser. No. 118,956
6 Claims. (Cl. 73—40)

This invention relates to a testing device, and, more particularly, to a testing device that is perculiarly adapted for use in testing gas lines and the like for leaks.

The checking of gas and other transmission lines for leaks has long been a serious problem. In addition, the testing of home and commercial building piping installations to determine that they are free of leaks and, therefore, suitable to carry natural or other gas within a building has also involved serious problems. Although numerous devices have heretofore been suggested for use in testing pipe installations for leaks, no fully satisfactory device has heretofore been available.

The instant invention is based upon the discovery of an improved manometer which is peculiarly advantageous for use in testing piping installations for leaks, and which is additionally useful in numerous other ways.

It is, therefore, an object of the invention to provide an improved manometer.

It is a further object of the invention to provide an improved device for use in testing piping installations for leaks.

Other objects and advantages will be apparent from the description which follows, reference being made to the accompanying drawing which is a perspective view of the apparatus according to the invention.

Referring now in more detail to the drawing, a manometer according to the invention is indicated generally at 10. The manometer 10 comprises a base 11, which is also a reservoir for fluid, and which carries a manometer tube 12 and a T-fitting 13. One line of the T-fitting 13 carries a female quick-disconnect part 14 which is also a valve that is closed except when a cooperating male quick-disconnect part 15 is operatively engaged therewith. A lower tank valve 16 is carried in the line of the T 13 opposite the reservoir 11, and is, in turn, engaged in the lower extremity of a tank 17. The upper end of the tank 17 is connected with a second T 18, one leg of which carries a top tank valve 19, and another of which is connected through a suitable gas-tight fitting 20 to a flexible tube 21. The opposite end of the flexible tube 21 is connected through a gas-tight fitting 22, a valve 23 and a gas-tight fitting 24 to the upper extremity of the tube 12.

The male quick-disconnect portion 15 is carried by one end of a line hose 25, the opposite end of which is attached through a gas-tight fitting 26 to a T 27. One leg of the T 27 carries a female disconnect portion 28 which is similar to the portion 14, and is adapted to receive a male quick-disconnect part 29 which is connected through a tube 30 to an aspirator bulb 31. The bulb 31 is of the check valve type, so that it is effective to direct air through the tube 30, but resists the flow of air from the tube. A third leg of the T 27 carries a male quick-disconnect portion 32. It will be noted that the male quick-disconnect parts 15, 29 and 32 are shown in the drawing in their disconnected conditions.

The manometer 10 of the invention is used in any one of several ways, depending upon the specific operation to be conducted. For example, if a relatively low pressure in a gas line (not shown) is to be determined, the male quick-disconnect part 32 is engaged with a cooperating female quick-disconnect portion 33, which is carried by a universal spud adapter 34 of the type shown and described in detail in U.S. Patent 2,976,063, and the adapter 34 is then connected to the line in which the pressure is to be measured. The valve 16 of the manometer 10 is closed, and the valves 19 and 23 are opened. The male quick-disconnect portion 15 is then engaged with the female quick-disconnect portion 14, so that the pressure within the line being tested is applied to fluid within the reservoir 11, causing it to rise in the tube 12 to a level which depends upon the pressure. The right hand side of a scale 35 is calibrated for a direct reading of the applied pressure in inches of water, ounces of pressure, or both.

When a higher pressure is to be determined using the manometer 10, the valve 16 is again closed, but the valve 23 is also closed, so that the condition of the valve 19 is immaterial. The male quick-disconnect portions 15 and 32 are then connected to the corresponding female quick-disconnect portions 14 and 33, as described above, and the higher pressure in pounds per square inch is read on an appropriately calibrated indicia on the left hand side of the scale 35. Because the valve 23 is closed, an air cushion or air spring within the tube 12 must be compressed by the fluid which is forced upwardly therein by the applied pressure, so that a given fluid height indicates a higher pressure, under these circumstances, then would the same fluid height when the valves 23 and 19 are open, as previously described.

When the manometer 10 is to be employed to test a piping system for leaks, all valves in the system (not shown) which would otherwise enable the relief of pressure therein are first closed, and the spud adapter 34 is connected in the manner discussed above. The valve 16 is opened, and the valves 19 and 23 are closed. All three of the male quick-disconnect portions 15, 29 and 32 are engaged in their cooperating female portions 14, 28 and 33, and the aspirator bulb 31 is actuated until a desired pressure, as indicated by the fluid height in the tube 12, has been applied to the system. The male quick-disconnect portion 29 is then disengaged from its female portion 28, and the valve 16 is closed. The valve 23 is then opened, so that the pressure within the tank 17 is applied to the fluid in the tube 12. A short time after the valve 23 has been opened, usually from about thirty seconds to about a minute, the fluid height in the tube 12 will reach a steady condition if there is no leak in the piping system being tested. If the system has a leak, the fluid level will progressively decrease as the pressure in the system being tested diminishes. If the instrument is being used in a hot sun to check piping systems for leaks, the tank 17 should be shaded because, otherwise, temperature increases in the compressible fluid therein caused by absorption of radiant energy by the tank 17 will cause increases in the pressure within the tank, and a stable condition in a system without leaks will not be reached until substantial equilibrium is reached between the tank and its surroundings. This tank is preferably made of aluminum because of its comparatively high heat conductivity, which minimizes the time required for equilibrium to be achieved.

It will be appreciated that, when the manometer 10 is used as described in the preceding paragraph, the fluid column in the tube 12 is balanced between the pressure applied to the reservoir 11 from the piping system being tested, and the pressure within the tank 17. A relatively small decrease in the pressure in the system being tested will cause a comparatively large change in the fluid height in the tube 12. Also, in any given specific instrument, the magnitude of the change in the fluid column height, at a given applied pressure, indicates a pressure change within the system being tested of a predetermined magnitude. For example, in a specific instrument according to the invention, which instrument has been made and tested, when a pressure of 100 pounds per square inch has been applied to the reservoir 11, and the tank 17 is pressurized to 100 pounds, and the valve 23 is then opened while the valve 16 is closed, a decrease of ⅛ of an inch in the height of the fluid in the column 12 corresponds with a decrease of one inch of water in the pressure of the system being tested. While the magnitude of the pressure decrease which is indicated by a particular drop in fluid height depends upon the magnitude of the applied pressure, use of the instrument to determine magnitude of pressure drop is simple at any given applied pressure. It will also be appreciated that the instrument can be employed to determine the magnitude of pressure increases in a given system, and in generally the same manner as described above for determining the magnitude of pressure decreases.

So far as is known, there has not heretofore been available any practically effective device for measuring the magnitude of decrease or increase in pressure in a piping system being tested for leaks. For example, if the tank 17 of the previously described instrument which has been tested were not used in making the afore mentioned leak tests, a drop in fluid height of ⅛ inch from 100 pounds per square inch pressure would indicate a pressure drop within the piping system being tested of about 5 pounds per square inch. It will be appreciated that the time required for a small leak to cause a pressure drop of such magnitude would be unrealistically long in any practical system of leak testing, and, also, that variations in ambient temperature would affect the accuracy of measurement to such an extent that reliability would be in serious doubt. It is frequently important to know the magnitude of a leak; this can be calculated if the size of a piping system and the pressure and temperature therein, as well as the rate of pressure drop, are known. Similarly, a piping system of unknown volume without a leak can be pressurized; a quantity of air can then be withdrawn therefrom and the volume of withdrawn air measured; and the volume of the piping system can be calculated from the pressure drop measured, and caused by the withdrawal of the known volume of air.

It will be apparent that various changes and modifications can be made from the specific details described herein and shown in the attached drawings without departing from the spirit and scope of the invention as defined in the appended claims.

What I claim is:

1. A testing device comprising a measuring fluid reservoir, a tubular element in fluid communication with said reservoir, and having an open upper end, chamber means in fluid communication with the open upper end of said tubular element, first valve means effective for opening the upper end of said tubular element to atmosphere, for enabling fluid communication between the upper end of said tubular element and said chamber means, and for preventing such fluid communication, means, including a conduit, releasably attachable to a conduit system and the like to be tested to provide fluid communication with the interior thereof, first fluid conduit means effective to apply from said releasably attachable means to fluid in said reservoir the momentary pressure within said pressurized conduit system and the like to be tested, second fluid conduit means providing fluid communication between said first fluid conduit means and said chamber, and second valve means movable between a first position and a second position, and enabling, when in the first position, fluid flow through said second conduit means, whereby said chamber is pressurized to the pressure applied to the fluid in said reservoir through said first conduit means, and, when in the second position, preventing fluid communication through said second conduit means between said chamber and said reservoir.

2. A testing device as claimed in claim 1 wherein said first valve means comprises a first valve effective to regulate flow between said tubular element and said chamber means, and a second valve effective to regulate flow to atmosphere.

3. A testing device as claimed in claim 1 wherein said first fluid conduit means includes a fitting effective to receive pressure from an external source, and means effective to resist the flow of air from said first fluid conduit means toward said external source.

4. A testing device comprising a measuring fluid reservoir, a tubular element in fluid communication with said reservoir, and having an open upper end, chamber means in fluid communication with the open upper end of said tubular element, means, including a conduit, releasably attachable to a conduit system and the like to be tested to provide fluid communication with the interior thereof, valve means movable between a first position and a second position, and enabling, when in the first position, fluid communication between the upper end of said tubular element and said chamber means and preventing, when in the second position, such fluid communication, first fluid conduit means effective to apply to fluid in said reservoir, from said releasably attachable means, the momentary pressure within a pressurized conduit system to be tested, second fluid conduit means providing fluid communication between said first fluid conduit means and said chamber, and valve means movable between a first position and a second position, and enabling, when in the first position, fluid flow through said second conduit means, whereby said chamber is pressurized to the pressure applied to the fluid in said reservoir through said first conduit means, and when in the second position, preventing fluid communication through said second conduit means between said chamber and said reservoir.

5. A testing device comprising a tubular element having first and second open ends, indicating fluid in communication with the interior of said tubular element, said indicating fluid being visible through said tubular element, chamber means in fluid communication with the first open end of said tubular element, first fluid conduit means releasably attachable to a conduit system and the like to be tested effective to pressurize a conduit system and the like to be tested, pump means to pressurize said first conduit means, second fluid conduit means to apply to the second open end of said tubular element the momentary pressure within said conduit system and the like to be tested, third fluid conduit means to pressurize said chamber to the momentary pressure within a conduit system and the like to be tested, and valve means effective, when in a closed position, to prevent fluid communication between said chamber means and said conduit system and the like to be tested, whereby, when the pressure of a conduit system and the like is applied, through said second fluid conduit, to the second open end of said tubular element and the chamber pressure is applied to the first open end of said tubular element and said valve means is closed, indicating fluid within said tubular element is subjected on one side to the pressure of said chamber means and on the other side to the instantaneous pressure of the conduit system and the like and is balanced so long as the two pressures are equal.

6. A testing device comprising a tubular element having first and second open ends, indicating fluid in communication with the interior of said tubular element, said indicating fluid being visible through said tubular element, chamber means in fluid communication with the first open end of said tubular element, means, including a conduit, releasably attachable to a conduit system and the like to be tested to provide fluid communication with the interior thereof, first fluid conduit means to apply from said releasably attachable means to the second open end of said tubular element the momentary pressure within said conduit system and the like to be tested, second fluid conduit means to pressurize said chamber to the momentary pressure within a conduit system and the like to be tested, and valve means effective, when in a closed position, to prevent fluid communication between said chamber means and said conduit system and the like to be tested, whereby, when the pressure of a conduit system and the like is applied, through said first fluid conduit, to the second open end of said tubular element and the chamber pressure is applied to the first open end of said tubular element and said valve means is closed, indicating fluid within said tubular element is subjected on one side to the pressure of said chamber means and on the other side to the instantaneous pressure of the conduit system and the like and is balanced so long as the two pressures are equal.

References Cited in the file of this patent

UNITED STATES PATENTS

| | | |
|---|---|---|
| 1,027,834 | Fulmer | May 28, 1912 |
| 1,340,176 | Meyer | May 18, 1920 |
| 2,719,426 | Lamb et al. | Oct. 4, 1955 |